United States Patent [19]
Fox et al.

[11] Patent Number: 5,632,931
[45] Date of Patent: May 27, 1997

[54] BLOATED MINERAL OXIDE CARRIER FOR PACKED-BED FLUID STREAM CHEMICAL PROCESSES

[75] Inventors: Irwin Fox, deceased, late of Chesterfield, Mo., by Richard B. Fox, Stanley M. Rosenblum, executors; Alvin Samuels, New Orleans, La.

[73] Assignee: Gas Sweetener Associates, Inc., Chesterfield, Mo.

[21] Appl. No.: 518,645

[22] Filed: Aug. 24, 1995

Related U.S. Application Data

[63] Continuation-in-part of Ser. No. 253,976, Jun. 3, 1994, abandoned, which is a continuation-in-part of Ser. No. 69,073, May 28, 1993, Pat. No. 5,320,992, which is a continuation-in-part of Ser. No. 878,031, May 4, 1992, Pat. No. 5,264,194.

[51] Int. Cl.$^6$ ................................................. B01J 32/00
[52] U.S. Cl. .................... 252/378 R; 264/43; 502/80; 502/87; 502/439; 502/503; 502/514
[58] Field of Search ................... 423/231, 242.1, 423/244.01, 244.02, 244.03, 244.1, DIG. 5; 502/80, 84, 87, 406, 503, 514, 439; 252/378 R; 264/43

[56] References Cited

U.S. PATENT DOCUMENTS

| | | | |
|---|---|---|---|
| 1,934,242 | 11/1933 | Smyly | 423/231 |
| 3,118,658 | 1/1964 | Dennert | 263/21 |
| 3,962,135 | 6/1976 | Alafandi | 252/450 |
| 4,071,369 | 1/1978 | Kurz et al. | 106/40 R |
| 4,142,994 | 3/1979 | Alafandi | 252/450 |
| 4,201,751 | 5/1980 | Holter et al. | 423/210 |
| 4,246,243 | 1/1981 | Fox | 423/225 |
| 4,366,131 | 12/1982 | Fox | 423/231 |
| 5,320,992 | 6/1994 | Fox et al. | 502/84 |

FOREIGN PATENT DOCUMENTS

| | | | |
|---|---|---|---|
| 147174 | 2/1948 | Australia | 252/378 |
| 0073718 | 3/1983 | European Pat. Off. | 502/439 |

OTHER PUBLICATIONS

Publisher Society of Mining Engineers "Industrial Minerals and Rocks" 5th ed. vol. 1 (1983) pp. 81, 82, 84–87 and 91. (no month) Construction Materials by McCarl.

Buildex, Inc. "Information on Properties, Uses, and Specification; Buildex Lightweight Aggregate", (1991) p. 4 (Jan.) published by Buildex, Inc.; P.O. Box 15, Ottawa, Kansas 66067 U.S.A. (no author).

Primary Examiner—Gary P. Straub
Assistant Examiner—Timothy C. Vanoy
Attorney, Agent, or Firm—Jerome A. Gross

[57] ABSTRACT

Bloated minerals previously used as aggregates for lightweight concrete are here fragmented, wetted, and intermixed with particulate chemical reactants or catalysts, to serve as inert carriers therefor in industrial processes. One use is in the deep-bed flow-through process of reacting and removing hydrogen sulfide as contained in natural gas.

1 Claim, No Drawings

BLOATED MINERAL OXIDE CARRIER FOR PACKED-BED FLUID STREAM CHEMICAL PROCESSES

CROSS-REFERENCE TO RELATED APPLICATIONS

This application is a continuation-in-part of application Ser. No. 08/253,976, filed Jun. 3, 1994, now abandoned, which is a continuation-in-part of application Ser. No. 08/069,073, filed May 28, 1993, now U.S. Pat. No. 5,320,992, issued Jun. 14, 1994, which is a continuation-in-part of application Ser. No. 07/878,031, filed May 4, 1992, now U.S. Pat. No. 5,264,194, issued Nov. 23, 1993.

BACKGROUND OF THE INVENTION

1. Field of the Invention

This invention relates to chemical processes carried on especially in deeply-packed beds of inert carrier material which bear reactants, exposing them to a contaminated fluid stream, for example. For sweetening streams of natural gas polluted with hydrogen sulfide, such beds of carrier material may typically be ten feet or more in depth, and must not crush under its overlaying weight.

2. Description of the Related Art

U.S. Pat. No. 5,320,992, dated May 28, 1993, discloses that calcined montmorillonite serves as an inert mineral carrier for reactant oxides used in sweetening natural gas polluted with hydrogen sulfide. It is strong enough that the packed beds may be as deep as 20 feet without compacting. To achieve such strength and to attach reactant oxide particles as well, it is calcined. Porosity obtained by calcining serves to absorb and retain water sufficiently that, after draining, when the moist particles are intermixed with a reactant iron oxide, the oxide will be retained on the particles to react hydrogen sulfide which pollutes the natural gas.

Shale and slate are the principal clay minerals which, when heated beyond calcining temperature, bubble within and expand ("bloat"); (Society of Mining Engineers "Industrial Minerals and Rocks" [1983], p. 82). They do not lose their strength when bloated, and are used to serve as light-weight aggregates for concrete.

Expanded perlite, which is not strong enough for such use, is shown in U.S. Pat. No. 4,201,751 to Holter, to be sprayed, along with water and caustic soda, to purify very hot gases (at temperatures up to 750° C.) in a turbulent gas stream.

SUMMARY OF THE INVENTION

The high-strength bloated minerals, used heretofore nearly exclusively as aggregate for light-weight concrete, are discovered to serve the need of many chemical processes for inert carriers for reactants or catalysts. The present low-cost material, fragmented to present surfaces consisting largely of tiny concavities, wetted to retain particles of reactants or catalysts, serve (for example, in place of calcined montmorillonite) as the inert carrier for reactant iron oxide, in deep beds through which hydrogen sulfide-polluted natural gas is flowed for "sweetening".

A now-know disposable oxide carrier now in use for scavenging hydrogen sulfide (as shown in our U.S. Pat. No. 5,320,992) was prepared by calcining montmorillonite. With that mineral, calcining yields porosity (as well as the necessary crush strength and insolubility); once thoroughly wetted with water and then drained, moisture retained by its porosity will hold particulate oxides on its surfaces.

In the present invention, a heat-bloated mineral is fractured to yield broken-cell surfaces which, when wetted and drained, remain moist enough to retain particles of a reactant or catalyst which, in the following example, is an iron oxide.

DESCRIPTION OF THE PREFERRED EMBODIMENT

Since our immediate contemplated use of the high strength aggregate material is as an inert support in flow-through deep bed processes, such as in sweetening gases and liquids polluted by hydrogen sulfide, the following tests were made:

Two test columns of the "packed bed" type, ten feet deep, were set up at a gas treatment plant at St. Louis, Mo. In one column, the reactive oxide was carried by the now-accepted montmorillonite (sold already mixed as "SulfaTreat" by Gas Sweetener Associates, Inc., St. Louis, Mo.). In the other packed column, the inert vehicle was bloated shale, fragmented and sized like the montmorillonite material, that is, nearly all in the size range between four mesh and twenty mesh. The tests began on May 31, 1995 and continued for two months, with both columns then still performing satisfactorily.

The direction of gas flow was downward through the packed material. Readings of test instrumentation were made almost daily for the presence of hydrogen sulfide remaining unreacted at the two-foot-down level, and after the first 22 days, at the five-foot-down level as well. The pressure drop through the entire ten-foot columns was measured at the outlet level. It was necessary to discontinue the tests after 62 days; further results of interest would have been obtained had it been feasible to continue the tests to exhaustion of oxide.

The column containing the new fragmented bloated-cell material was found to have functioned as well as the column packed with the montmorillonite. Day-to-day variations as noted by the instrumentation were found to be largely due to transient conditions. By the end of the 62-day period, a fairly clear pattern appeared, as shown by the following tabulation:

| OXIDE CARRIER | PRESSURE DROP AT OUTLET | $H_2S$ UNREACTED AT FIVE FOOT LEVEL |
| --- | --- | --- |
| Col. 1 - Montmorillonite | 0.307 lbs. | 24 p.p.m. |
| Col. 2 - Bloated shale | 0.487 lbs. | 16 p.p.m. |

These conclusions are drawn: Each of the two bed materials performed satisfactorily. Supporting the oxide particles on bloated shale particles may afford somewhat greater reactivity than the oxide on the montmorillonite vehicle, with an offsetting increase in the pressure drop experienced by the gas flow through the bed of the bloated-and-broken particles. No conclusion was drawn as to circumstances under which either of the vehicles would be preferred.

The foregoing is an example of the effective use of such high strength, low-weight bloated mineral material, when crushed and moistened, as an inert carrier of a reactant or catalyst in chemical processes. In the example so selected, the fluid stream is of a gas; the fluid may instead be a liquid, for example, a hydrocarbon liquid similarly polluted. Such example shall not be considered as limiting; instead this disclosure is to be considered as fully coextensive with the claims which follow.

It is claimed:

1. A method for the preparation of a material for use in a reaction bed in a packed bed fluid stream chemical process, said material comprising an inert carrier intermixed with a particulate chemical reactant or catalyst and said method comprising the steps of:

- selecting a mineral selected from the group consisting of shale or slate which will bloat upon heating to form cells which solidify on cooling to ambient temperature and are of sufficient crush strength to support an overlaying bed thereof ten feet deep;
- heating said mineral to cause bloating;
- cooling said mineral to ambient temperature;
- fracturing the cooled mineral into particles to include particles having surfaces of broken cells;
- classifying those particles into various size ranges;
- wetting the surfaces of the particles of a selected size range and draining off the excess liquid;
- mixing the wetted particles with particulate reactant or catalyst while the wetted particles are still moist and wherein the moisture remaining on the particles retains said particulate reactant or catalyst, and
- packing said reactant bed with the particles resulting from the mixing step.

* * * * *